United States Patent [19]
Jakobsson

[11] 3,980,837
[45] Sept. 14, 1976

[54] APPARATUS FOR PULSING IN TELEPHONE SETS

[75] Inventor: Lars Erik Jakobsson, Enskede, Sweden

[73] Assignee: Telefonaktiebolaget L M Ericsson, Stockholm, Sweden

[22] Filed: Mar. 12, 1975

[21] Appl. No.: 557,655

[30] Foreign Application Priority Data
Mar. 29, 1974 Sweden.......................... 74042789

[52] U.S. Cl. ............................................. 179/90 K
[51] Int. Cl.² ......................................... H04M 1/272
[58] Field of Search............ 179/16 EC, 90 R, 90 K, 179/90 BB

[56] References Cited
UNITED STATES PATENTS

| | | | |
|---|---|---|---|
| 3,538,256 | 11/1970 | Lucas................................ | 179/90 K |
| 3,787,639 | 1/1974 | Battrick ............................ | 179/90 K |
| 3,856,982 | 12/1974 | Lawson et al..................... | 179/90 R |
| 3,881,070 | 4/1975 | McCabe et al.................... | 179/90 K |

Primary Examiner—Kathleen H. Claffy
Assistant Examiner—Randall P. Myers
Attorney, Agent, or Firm—Hane, Baxley & Spiecens

[57] ABSTRACT

In a push button operated telephone set to be used in a telephone system designed for break/make impulsing an electronic circuit is used for converting the push button signals to break/make pulse trains. In order to supply power to the electronic circuit from the central battery through the subscriber's line even if the terminal voltage is low at the subscriber, a DC voltage converter is used in the set to multiply the terminal voltage. This converter includes a pulse oscillator which is also used as a timing pulse generator for the electronic circuit, controlling the frequency, make/break ratio and pulse sequence intervals of the dial pulse trains sent to the exchange.

3 Claims, 5 Drawing Figures

APPARATUS FOR PULSING IN TELEPHONE SETS

The present invention relates to a circuit in a telephone set intended for a telephone system with dial pulsing. In this set the dialling is done asynchrounously with the impulse transmission, for example by means of a key set, and the telephone set is provided with electronic circuits for storing the dialling information and influencing the pulsing circuits in accordance with this information in the proper sequence and at a rate required by the impulse receiver of the telephone system.

It is desirable that the subscribers in an existing telephone system where the called numbers are dialled shall have available the convenience that key-sending brings about. When for some reason it is impossible to rebuild the signal-receiving devices of the telephone exchange efforts have been made to equip the telephone set with a converter unit where the numerical information is stored. The stored numbers are then read in the proper sequence and are converted to a pulse train with the correct impulse ratio and the correct frequency and with desired pauses between the pulse series corresponding to different numbers. Owing to the possibility of producing cheap micro circuits it has been possible to place a key set as well as the electronics required for the conversion within the space normally occupied by the dial.

A problem with electronic equipments in telephone sets is the power supply, which if possible should be taken through the subscriber's line in order to make the telephone set independent from external current sources. In the Swedish published patent application No. 348,612 an arrangement of this kind has been described where the telephone set is provided with a storage battery which is charged through the line when the handset is on hook. This arrangement has several disadvantages. Separate storage batteries should be avoided since they are expensive and require considerable maintenance. Furthermore many telecommunication administrations do not want permanently power consuming circuits connected to the lines because this makes the measurement of the line condition more difficult.

The British Pat. No. 1,318,858 gives another solution. There the power-supply is provided directly from the line in the call-state. A capacitor is utilised to keep the voltage during the break impulses and the voltage across the capacitor is stabilized by a Zener diode stabilizing the voltage across the electronic circuit. However, it is difficult to make the electronic circuit in the apparatus work satisfactory as the voltage across the telephone set's input clips in the call-state often is very low especially when the line is long and a 25 V exchange battery is used. The regulation of the supply voltage will not be satisfactory as the Zener diode does not conduct at too low voltages. The voltage is mainly determined by the current which must flow in the subscriber's loop in order to indicate a call.

Furthermore the arrangements earlier known generate the impulses by means of relays. These are bulky so normally there is no room for them in the unit replacing the dial.

An arrangement according to the invention can operate even if there is a low voltage across the telephone set's input terminals in the call-state which often is the case in telephone sets having a carbon microphone.

The characteristics of the invention appear from the appended claims.

The invention will be described in connection to the appended drawings where:

Figure 1:
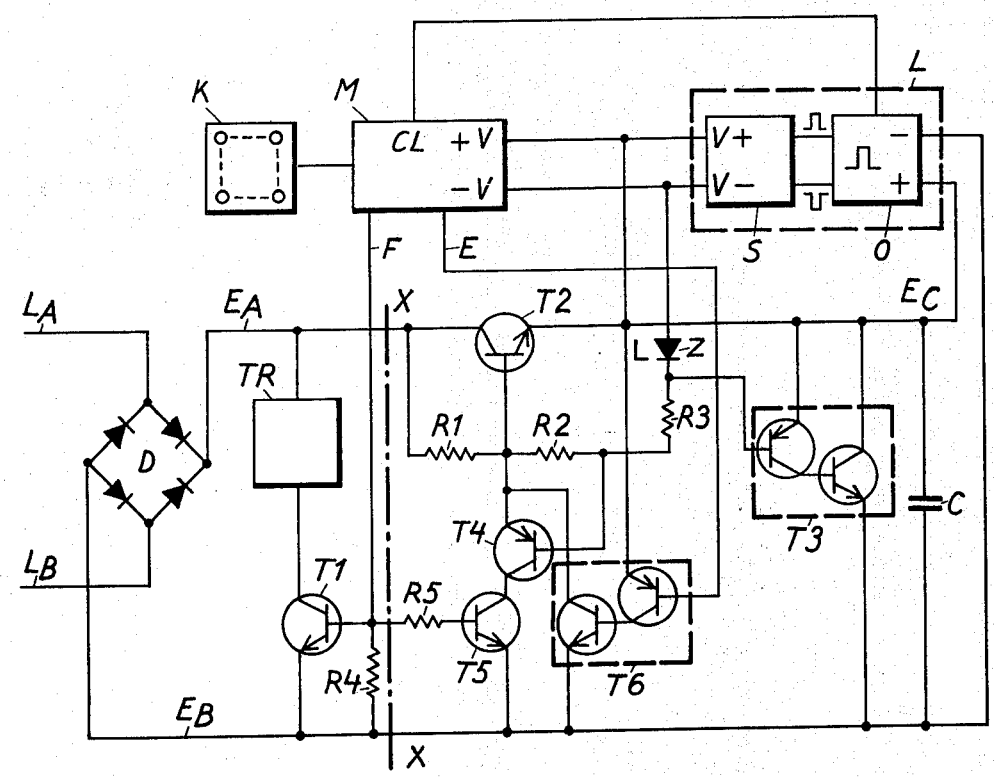
FIG. 1 shows a circuit diagram for a telephone set according to the invention.

In FIG. 1 an elementary diagram for an arrangement for pulsing is shown. All units shown on this diagram except the transmission circuit itself are installed in a key set module intended for replacing the normal dial. K denotes a key set connected to an electronic circuit M normally contained within a large scale integrated MOS circuit. This circuit, in itself already known, contains the logical circuits required to convert the key set pulses to interruption pulses in the subscriber's loop. The circuit has two outputs where a first output E delivers interruption pulses blocking a series transistor T2, while the output F delivers pulses that by means of the transistor T1 disconnect the transmission circuit TR of the apparatus while pulsing. The circuit M receives its current supply from a DC voltage converter L which in its turn is fed from the subscriber's line. The DC converter includes an oscillator 0 and a voltage multiplying circuit S which may be composed of a transformer with subsequent rectifiers or of a voltage multiplier comprising rectifiers and capacitors. Furthermore the oscillator 0 is used as a clock signal generator for the circuit M and consequently controls the time sequence when pulsing. By placing the clock signal source in this way outside the circuit M the latter can be made smaller and consequently cheaper. A clock signal generator driving many function blocks within an integrated circuit must work on a relatively high power level and therefore occupies a relatively large area on the circuit.

Figure 2:
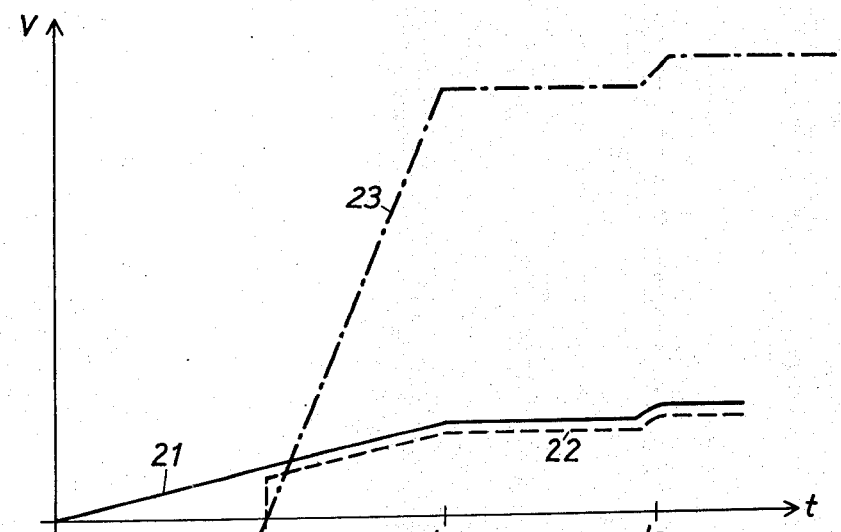
FIG. 2 shows a voltage-time-diagram explaining the function of the arrangement.

The oscillator 0 gets its voltage supply from the telephone set's input $L_A$, $L_B$ through a polarizing rectifier bridge D and the series transistor T2 serving as a series regulator as well as a pulsing contact. Across the series regulator's output $E_B$, $E_C$, a there is connected a storage capacitor C which is shunted by a transistor T3 working as a parallel regulator. The regulator transistors T2 and T3 are controlled by a reference voltage source including the Zener diode Z and resistors R1, R2, R3. The reference voltage source is connected across the output V+, V− of the DC voltage converter. When the subscriber's line is connected to the input $L_A$, $L_B$ through a not shown hook switch, the point $E_A$ always gets a positive potential while the point $E_B$ is negative. The transistor T2 gets base current through the resistor R1 and conducts a mainly constant current to the capacitor C which will be charged according to the curve 21 of FIG. 2. At the time $t_0$ the capacitor voltage has such a high value that the oscillator 0 of the DC converter starts delivering pulses with an amplitude according to curve 22 of FIG. 2. The DC converter starts emitting a voltage increasing according to the curve 23. During the whole charging time a zero setting circuit in the circuit M keeps the outputs E and F at a defined potential (V+) keeping the transistor T1 conducting and the transistor T6 blocked. When the output voltage from the DC converter at the time $t_s$ reaches such a value that the Zener diode Z is conducting the transistor T2 begins to act as a series regulator. The current through resistor R2 opens the transistor T4 and as the transistor T5 also is conducting the base voltage of the transistor T2 is reduced and the charging current is choked until a certain equilibrium position is obtained determined by the breakdown voltage of the Zener diode. The output voltage from the DC converter then has the value V— which is required to run the circuit M.

Push button dialling is done by means of the key set K. The circuit M stores the received information and retransmits it as pulsing information on the outputs E and F. The clock signal received from the oscillator 0 controls time generating circuits in the circuit M so that information about the dialled digits comes out with the pulse frequency, pulse ratio and time between the pulse trains used in the telephone system. Frequent pulse frequencies are 10 and 20 Hz with break/make ratios 50/50, 60/40 and 67/33. The time between two different pulse sequences representing consecutive digits is 400 or 800 ms for 10 Hz repetion frequency and 200 or 400 ms for 20 Hz.

The pulse transmission is initiated by the output F becoming negative causing the transistor T1 to be cut off thereby separating the transmission circuit TR from the line. This corresponds to the short-circuit of the transmission circuit taking place in common dials in order to prevent the pulsing from being heard in the ear-phone. Also the transistor T5 is cut off as its base receives the same potential as the emitter. Then current can not flow through the transistor T4 so the series regulation of the supply voltage to the circuit M ceases. Then V— starts increasing somewhat (ca½V) again and the transistor pair T3 starts conducting bringing about a shunt regulation of the voltage between points $E_B$ and $E_C$. This is shown at the time $tp$ in FIG. 2. The current now passing through the transistor T2 and distributed to the transistor T3 and the DC converter L corresponds to the current that flows in a telephone set provided with a dial when the short circuit contact is closed.

The interruption pulses are controlled by negative pulses supplied by the output E of the circuit M. The transistor T6 conducts fully and connects the base of the transistor T2 directly to the negative potential $E_B$. The transistor T2 is cut off and as the transistor T1 was previously cut off, the current in the subscriber's loop is entirely cut off. During the interruption the voltage between the points $E_B$ and $E_C$ is maintained by the capacitor C. After each interruption the output E reverts to the positive potential and transistor T2 once again becomes conducting. The transistor T5, however, remains cut off as the output F maintains blocking potential during the pulse train. During the interval between the separate digit pulse trains point F reverts to positive potential causing the transistor T1 to open the transmission circuit and the transistor T5 once again to activate the series regulation.

Figure 3:
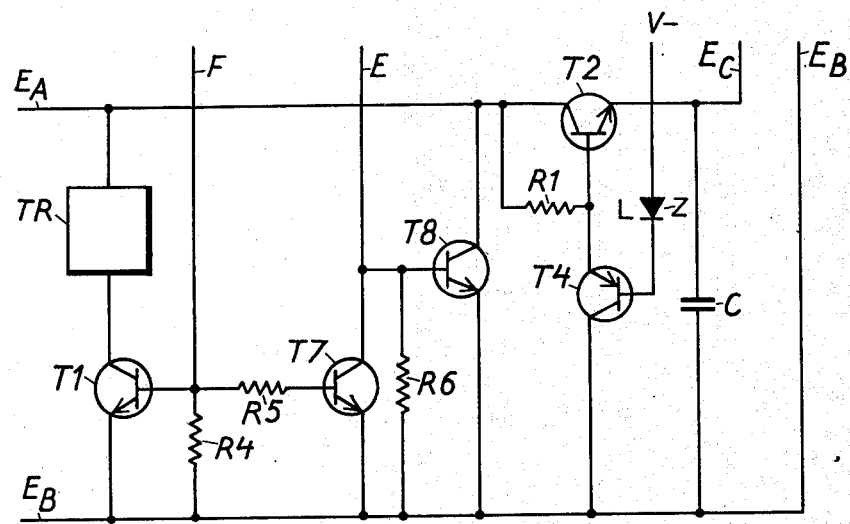
FIG. 3 shows a modification of the arrangement according to FIG. 1.

FIG. 3 shows a modification of the arrangement according to FIG. 1 where the subscriber's loop is closed and broken by means of a special transistor T8 directly connected across the branches $E_A$ and $E_B$. The base of the transistor T8 is connected to the output E of the circuit M, to the collector of the driving transistor T7 and through the resistor R6 to branch $E_B$. The transistor T7 has the emitter directly connected to branch $E_B$ and the base connected to the output F through a resistor R5. The driving transistor T4 connected to the base of the series transistor T2 has the collector directly connected to branch $E_B$ while the base is connected to the Zener diode Z. In this case the parallel regulation transistor T3 is missing. Instead the series regulation works to some extent also during the pulse trains.

In the idle state the outputs E and F, as earlier, have a positive potential. The transistor T1 conducts keeping the transmission circuit connected. The transistor T7 is conducting keeping the base of the transistor T8 on such a low potential that the later is cut off. Series regulation takes place in almost the same way as earlier described, i.e. the series transistor T2 is controlled by the transistor T4 depending on the output voltage from the DC converter L. When the pulsing starts the output F first receives a negative potential and the transistors T1 and T7 are cut off. The transmission circuit TR is blocked and the transistor T8 becomes conducting and takes over the short circuiting function. The voltage drop across the telephone set in this situation becomes considerably lower than in the circuit according to FIG. 1 and there is a smaller risk that the state where the transmission circuit is disconnected is interpreted as an interruption if the battery voltage is low and the line is long. The negative interruption pulses on the output E cut off the transistor T8 and reduce the current of the loop enough to make the telephone exchange indicate an interruption. The capacitor C is also charged — except between the pulse trains — to a certain extent during the break intervals where it is possible to draw a current from the line of the magnitude 1 mA without indicating this as a closed loop.

During the interval between two sequential pulse trains the transistor T8 is once again cut off because the output F resumes a positive potential. At the same time the transistor T1 becomes conducting.

Figure 4:
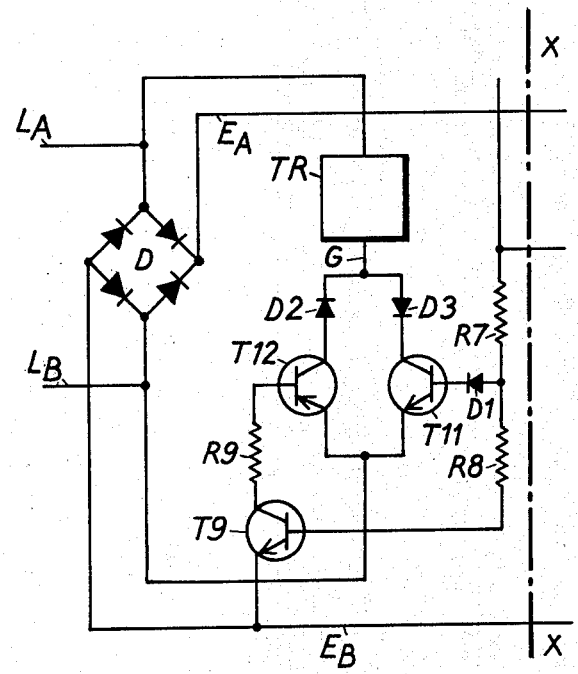
FIG. 4 shows another modification.

The dials used today are connected to the telephone set by means of a three-wire cable connected in such a way that the dial easily can be replaced when they fail. Two of the conductors are connected to the points corresponding to $L_A$ and $L_B$ in FIG. 1, while the third conductor is connected to the transmission circuit. According to FIG. 1 the key set unit must be connected by a four-wire cable to the rest of the circuit as none of the connection points of the transmission circuit is connected to $L_A$, $L_B$. In FIG. 4 a circuit is shown that enables the dial to be replaced directly by a key set unit because the points $L_A$, $L_B$ and G will be connected to the same points in the set as the dial. Only the parts situated to the left of the line X—X in FIG. 1 are shown in FIG. 4, the other parts are identical to the corresponding parts in FIG. 1.

The transmission circuit TR is directly connected to the points $L_A$, $L_B$ through a transmission gate consisting of two complementary transistors. Through this arrangement the polarity of the subscriber's line is of no importance. The base of the NPN-transistor T11 is connected to the output F through a blocking diode D1 and a resistor R7. The base of the NPN-transistor T12 is connected to branch $E_B$ through a resistor R9 and the emitter-collector circuit of a transistor T9. The base of the transistor T9 is connected to the output F through the resistors R7 and R8. The diodes D2 and D3 prevent reverse current from through the collector-base-diodes of T11 and T12.

If it is assumed that the input $L_A$ is positive then the transistor T11 conducts while the transistor T12 conducts if input $L_B$ is positive provided that the output F is positive. A negative potential on line F blocks the two transistors T11 and T12. Apart from the bidirectional transmission gate the arrangement shown in FIG. 4 works in the same way as the one shown in FIG. 1.

The invention is not restricted to the embodiments shown in the Figures, but may be modified within the scope of the claims.

We claim:

1. Key telephone set for connection to an exchange equipped for dialling by means of sending break pulses through the subscriber's line comprising a telephone instrument with speech transmitting and receiving circuits, a push button dial pad, an electronic circuit for storing the digits dialled on said push buttons and for converting said stored digits to a sequence of dial pulse trains having a pulse frequency, pulse ratio and pulse train as required by the pulse receiving means of the exchange, a DC converter comprising oscillator means and voltage multiplying means having an input connected to the subscriber's line in the hook-off state and an output connected to supply voltage terminals on said electronic circuit, said oscillator supplying timing pulses to said electronic circuit.

2. A key telephone set as claimed in claim 1 where the electronic circuit has a first output and a second output, said first output being connected on one hand to said transmitting and receiving circuits for disabling them during each of the pulse sequences corresponding to the different digits and on the other hand to said series pass voltage regulator for making it fully conducting, said second output being so connected to the voltage regulator that said regulator is made non conducting during the duration of each of the dial pulses of each of said pulse sequences.

3. A key telephone set as claimed in claim 3 where a shunt connected voltage regulator is connected across the input of the DC converter, a control input on said shunt connected voltage regulator being connected on one hand to the output of said DC converter and on the other hand to said series pass voltage regulator for activating said shunt connected voltage regulator when said series pass voltage regulator is disabled and for making said shunt connected voltage regulator non conducting during each of said deal pulses.

* * * * *